Jan. 30, 1962     L. J. CZERWONKA ET AL     3,019,127
FILTERING MEDIUM AND METHOD OF MAKING THE SAME
Filed Oct. 7, 1957
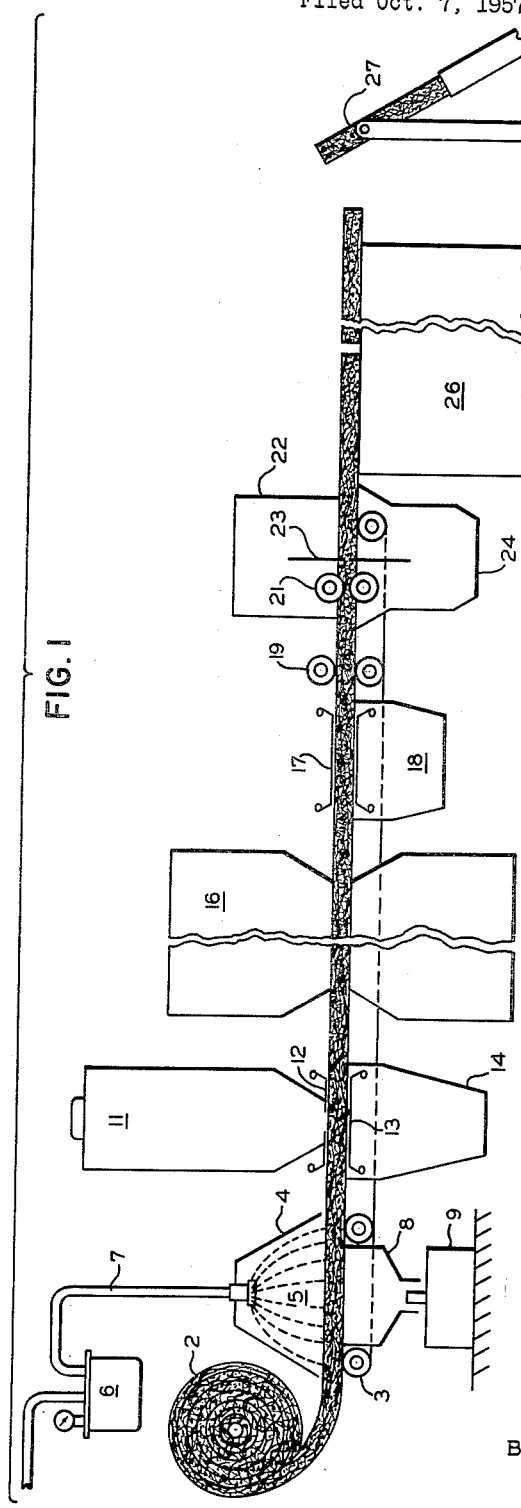
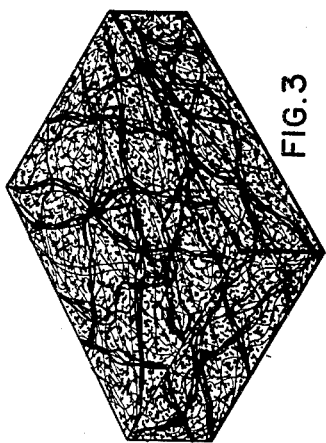
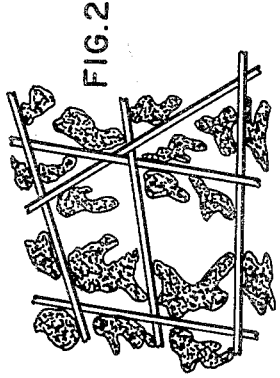
INVENTORS
LAWRENCE J. CZERWONKA
&
ROBERT F. LOGSDON
BY
*Ralph B. Brick*
ATTORNEY 3,019,127
FILTERING MEDIUM AND METHOD OF
MAKING THE SAME
Lawrence J. Czerwonka and Robert F. Logsdon, Louisville, Ky., assignors to American Air Filter Company, Inc., Louisville, Ky., a corporation of Delaware
Filed Oct. 7, 1957, Ser. No. 688,732
17 Claims. (Cl. 117—33)

This invention relates to a filtering medium and more particularly to an impregnated fluid filtering medium and a method of making the same.

In the past, various impurities and undesirable constituents such as toxic or odoriferous gases have been removed from fluid streams by passing the streams through a bed of granular particulate material such as activated carbon. Where the granular particles have been used alone to form a filtering bed, packing of the particles has occurred causing high resistance to fluid flow, the density of the bed being dictated by the contact arrangement of the particles making up such bed. In order to decrease the density of the bed and thus lower the resistance to fluid flow, particles have been glued, cemented or otherwise affixed to the exposed surfaces of materials such as wire screen. Although this basically uniplanar arrangement has served to control the resistance to some extent, the packing of the particles has not been as effectively avoided as is desired; nor, has contact of the fluid with the granular particles been as complete as is desired. Furthermore, in some instances, the bringing together of certain types of particles with materials such as metal wire has brought about a substantial poisoning effect, or a decrease in the desired fluid treating properties of the particles used.

The present invention provides an impregnated filtering medium capable of efficiently removing or otherwise treating toxic or odoriferous gases in fluid streams which avoids the above-mentioned difficulties, the medium of the present invention, with a minimum of fluid flow resistance, permitting maximum contact of a fluid stream to be filtered with the impregnating material used in order to increase the overall efficiency of the medium. Further, the present invention provides a filtering medium which utilizes impregnating materials in the most efficient manner possible without causing significant poisoning of such materials by supporting or surrounding environment.

Various other features of the present invention will become obvious to one skilled in the art upon reading the disclosure set forth hereinafter.

More particularly the present invention provides a fluid filtering medium comprising a bed of finely divided, low density fibrous material having spaced fluid inlet and fluid outlet faces with the fibers of such material between the inlet and outlet faces arranged to form an indeterminate maze of interstices therebetween, and fluid treating particulate material distributed in the maze of interstices between said faces, the particulate material having a particle size dependent upon the density and fiber size of the fibrous material. In addition, the present invention provides a method of making the filtering medium comprising the steps of passing a fibrous pad of filter material into a spraying zone, spraying such pad with an amount of liquid adhesive sufficient to insure that the pad is thoroughly treated with the adhesive, passing such pad from the spraying zone to a particle impregnating zone, impregnating the pad with particles, vibrating the bad to insure the particles are distributed properly in the interstices of such pad, passing such vibrated pad to a heating zone and curing the pad while in such zone at temperatures sufficient to reactivate the particles if necessary but below those which would destroy the adhesive.

It is to be understood that various changes can be made in the construction, form and arrangement of the filtering medium described herein and the several steps of the method for making such filtering medium, also described herein, by one skilled in the art without departing from the scope or spirit of this invention.

Referring to the drawings:

FIGURE 1 discloses a schematic flow diagram of the inventive method for making the new and useful filtering medium;

FIGURE 2 is a schematic enlarged view of a portion of the inventive filtering medium, disclosing details of the fibers as impregnated with particles; and FIGURE 3 is a schematic perspective view of a portion of the inventive filtering medium, disclosing further the distribution of particles in the interstices of the medium.

Referring to FIGURE 1 of the drawings, in carrying out the present invention, fibrous material of extremely low density and high permeability is fed from a roll 2 onto an endless conveyor 3. The fibrous material from roll 2 has the fibers thereof arranged to form an indeterminate maze of interstices between the spaced face of the material (FIGURES 2 and 3). Advantageously, the material can be of the glass fibrous type since such material is inert to moisture and most chemicals with which it might subsequently come into contact, including the adhesive or bonding materials described hereinafter. The glass fibrous material, which can be an expanded mat similar to that manufactured by the process disclosed in U.S. Patent 2,798,531, wherein an expanded mat of interconnected and bonded fibers is produced, can be introduced from a roll into which it has been initially wound in compressed form, the compressed material being expanded upon unwinding; or, it can be introduced from a roll into which it has been initially wound in uncompressed form. Advantageously, the strands of the fibers of the material can measure from approximately 20 microns to approximately 25 microns in diameter size. And, in this connection, it is to be noted that if the diameter of the fibers of glass fibrous material is too large, for example over 50 microns, the fibers are difficult to impregnate with the particles described hereinafter, the fibers becoming brittle and breaking when of such large size.

Once the fibrous material has been introduced as a pad onto conveyor 3, the pad is carried by the conveyor to a position under hood 4. The hood 4 is provided with a bank of spray nozzles 5 which are advantageously of the atomizing particle type, the nozzle bank extending transversely of the direction of movement of the pad a sufficient distance so as to cover the pad width when the pad is sprayed. A pressure vessel 6 in which an adhesive is stored is connected to the bank of spray nozzles by means of a conduit 7. As the pad passes under hood 4, an adhesive or bonding material is fed from vessel 6. It is to be noted that the adhesive can be fed at approximately 60 p.s.i. pressure to insure that the pad is thoroughly treated with such adhesive as it passes under the hood. It also is to be noted that an excess adhesive tank 8 is positioned under conveyor 3 immediately below hood 4 to catch any excess adhesive and to funnel the same to a salvage tank 9 from which such adhesive can be recirculated to pressure vessel 6.

The types of particulate material with which the pad is to be impregnated serve to determine, at least in part, the types of bonding adhesive with which the pad can be sprayed and the types of adhesives which can be used vary considerably. For example, adhesives such as water soluble suspensions of latex, benzine solutions of rubber materials, starches and some animal glues have been found to be well suited in instances where sorbitive particles comprise the impregnating material for the filtering medium; and, where the particulate material is to be one which is catalytic in nature, adhesive materials such as water-glass and feldspar have been found to be satisfactory. Advantageously, and especially where sorbitive particulate material is used, the adhesive can be one which is soluble in a solvent of comparatively high vapor pressure and low molecular weight since the solvent vapors tend to be adsorbed by the particulate material (described hereinafter) and is is important that such vapors be expelled in the curing step (also described hereinafter) at a temperature not exceeding the decomposition temperature of the adhesive. It has been found that both water and benzine ar easily expelled from most of the desirable particulate materials by heating to a temperature below the disintegration temperature of the adhesive.

It is further advantageous that the adhesive have a certain degree of tackiness or stickiness and, in this connection, an adhesive having a viscosity of 6 centipoises at 25° C. has been found suitable in carrying out the present invention. It also is to be noted that the type adhesive used be one in which the elastic properties of the adhesive are maintained after curing rather than one which is dried out upon curing to a point where elastic effectiveness is lost.

When the adhesive has been applied to the pad, the pad is moved from hood 4 by conveyor 3 to a position beneath the mouth of gravity feed hopper 11. It is to be noted that hopper 11 is spaced from hood 4 a sufficient distance to permit the tackiness or stickiness of the adhesive to develop to a maximum during the period of movement, this distance being controlled by the particular type of adhesive employed and the rate of movement of the conveyor. As the pad passes beneath the mouth of the hopper, particulate material which is stored in the hopper is gravity fed therefrom onto the pad. In this connection, it is to be noted that hopper 11 is provided with a metering slit 12 to control the quantity of particulate material fed onto the pad. Advantageously, the concentration of such particulate material per unit volume of fibrous pad can be approximately 4 percent.

The particle size of the particulate material plays an important role in the present invention since the particle size is significant in obtaining the desired maximum exposure of particulate material to a fluid stream destined to be treated. Further, the particle size is significant in maintaining a minimum of resistance to such fluid stream and in obtaining the best retention of the particles to the fibers of the fibrous pads used. If, as noted above, the particle size of the particulate material is too small, packing of the particles results and fluid resistance is undesirably high. Furthermore, if extremely fine particles should coat the fibers there results a lower weight of particles attached to the fibers thus decreasing the overall treating capacity of the medium. If, on the other hand, the particle size is too large, the particles do not distribute properly throughout the fibrous pad and do not adhere properly to such pad. In this connection, it has been found desirable that the diameter size of the particles be larger than the diameter size of the fibers of the filter pad since in such an arrangement there can be more weight of particulate material and a greater treating capacity with a lower resistance. Further, when an adhesive is used with particles of larger diameter than the fibers, there is no appreciable interference by such adhesive. Advantageously, the best conditions are obtained when the particle diameter size is within the range of approximately 15 to approximately 100 times the diameter size of the fibrous strands.

One of the most suitable types of particulate material which can be used with the fibrous pad is a sorbitive type and especially an adsorbent type such as activated carbon or charcoal. Activated carbon is capable of withstanding curing temperatures up to 1000° F., is capable of adsorbing chemicals of relatively high molecular weights, and can be chemically treated to adsorb lower molecular weight vapors. In instances where sorbent particles such as activated carbon are used, the most desirable size for such particles is one which falls within a range of approximately 12 to approximately 50 mesh; and, advantageously, the size of such particles can be of 20 to approximately 48 mesh in order to obtain maximum surface area exposure with minimum resistivity to the fluid stream to be filtered.

Further, with regard to the types of particulate material which can be used, it has been recognized that various other adsorptive materials such as silica gel, activated alumina, and fuller's earth serve as good adsorbents; and, in some instances, it is advantageous that the particulate material be of an absorbent type such as lime soda or calcium chloride. Moreover, in some situations, it has been found advantageous that the particulate material be one from a group of catalytic agents such as metals and/or their oxides.

To insure a proper distribution of the particles throughout the fibrous pad as the particles pass from the hopper 11, a vibrating screen 13 is provided immediately below the metering slit of the hopper. As the screen is caused to vibrate, it vibrates the pad passing thereover and shakes down the particles into the interstices of the pad. The excess particles which do not adhere to the pad are captured by a hopper 14 positioned below the screen and are resalvaged from this hopper. It is to be noted that the particle size of the particulate material passing from the feed hopper can be controlled and varied so that the size becomes progressively finer from one face of the fibrous material pad to the other face. Thus, in subsequent use of the pad for filtering purposes, the particle size progressively decreases from the fluid stream inlet face to the fluid stream outlet face. This arrangement serves to increase the overall efficiency of the pad since a higher weight concentration of particles is provided at the inlet face of the pad where the content of contaminants is large and a progressively increasing surface area is provided as the fluid stream treatment progresses. In this connection, it also is to be noted that the diameter of the fibers of the pad also can be varied so that the fibers and the interstices therebetween are progressively finer from the inlet face toward the outlet face.

After the particulate material has been properly applied to the fibrous pad, the pad can be moved into a gas-fired or electric curing oven 16, the type oven used depending upon the materials involved. The pad is allowed to reside in the oven for a period and at a temperature sufficient to set the adhesive and to reactivate the particles, if necessary. During the curing period, any solvent vapors of the adhesive solution which might have been adsorbed or absorbed by the particles are expelled therefrom, the temperature used to expel these vapors being maintained sufficiently high to reactive the particles but held below the decomposition temperature of the adhesive applied to the pad. In those instances where the particulate material is activated carbon, a residence period in the oven of 5 to 10 minutes at a temperature of approximately 220° F. has been found to be satisfactory to set the adhesive and reactivate the particles.

When the curing step has been completed, the pad again is vibrated under pressure to shake off any remaining excess particles, a pair of spaced vibrating screens 17 being used to accomplish such a step. An excess particle hopper 18 is positioned below screens 17 to catch the excess particles for salvage.

The pad is then fed by conveyor 3 and feed rolls 19 to a slitter 21 positioned in housing 22. Slitter 21 slits the pad longitudinally into several strips which are passed to a shear knife arrangement 23 where they are sheared into selected lengths. It is to be noted that the slitter and shear arrangement has a hopper 24 therebeneath to catch further excess particles. The severed strips then are passed to a filter assembly table 26 and from there to a packaging jig 27 where they are packaged in plastic bags for preservation until use.

The invention claimed is:

1. A fluid filtering medium comprising a bed of finely divided, low density fibrous material having spaced fluid inlet and fluid outlet faces with the fibers of said material between said inlet and outlet faces interconnected and bonded and the material expanded to form an indeterminate maze of interstices therebetween, and fluid treating particulate material distributed in said maze of interstices of said medium between said faces, the diameter size of the particles of said particulate material being larger than the diameter size of the fibers of said fibrous material.

2. A fluid filtering medium comprising a bed of finely divided, low density fibrous material having spaced fluid inlet and fluid outlet faces with the fibers of said material between said inlet and outlet faces interconnected and bonded and the material expanded to form an indeterminate maze of interstices therebteween and fluid treating particulate material distributed substantially uniformly throughout said maze of interstices between said faces, the diameter size of the particles of said particulate material being larger than the diameter size of the fibers of said fibrous material.

3. A fluid filtering medium comprising a bed of finely divided fibrous material having spaced fluid inlet and fluid outlet faces with the fibers of said material between said inlet and outlet faces interconnected and bonded and the material expanded to form an indeterminate maze of interstices therebetween and fluid treating particulate material distributed in said maze of interstices between said faces, the diameter size of the particles of said particulate material being larger than the diameter size of the fibers of said fibrous material and the particle size of said material being progressively finer from said inlet face toward said outlet face of said fibrous material.

4. A fluid filtering medium comprising a bed of finely divided low density fibrous material having spaced fluid inlet and fluid outlet faces with the fibers of said material between said inlet and outlet faces interconnected and bonded and the material expanded to form an indeterminate maze of interstices therebetween, said fibers and interstices therebetween becoming progressively smaller from said inlet face toward said outlet face and fluid treating particulate material distributed in said maze of interstices between said faces, the diameter size of the particles of said particulate material being larger than the diameter size of the fibers of said fibrous material.

5. A fluid filtering medium comprising a bed of finely divided low density fibrous material having spaced fluid inlet and fluid outlet faces with the fibers of said material between said inlet and outlet faces interconnected and bonded and the material expanded to form an indeterminate maze of interstices therebetween, said fibers and the interstices therebetween becoming progressively finer from said inlet face toward said outlet face and fluid treating particulate material distributed in said maze of interstices between said faces, the particle size of said material being progressively finer from said inlet face toward said outlet face of said fibrous material, and the diameter size of the particles of said particulate material being larger than the diameter size of the fibers of said fibrous material.

6. A fluid filtering medium comprising a bed of finely divided low density fibrous material having spaced fluid inlet and fluid outlet faces with the fibers of said material between said inlet and outlet faces interconnected and bonded and the material expanded to form an indeterminate maze of interstices therebetween, fluid treating particulate material distributed in said maze of interstices of said fibrous material bed between said faces, the diameter size of the particles of said particulate material being larger than the diameter size of the fibers of said fibrous material and an adhesive to bond said particulate material to the fibers of said fibrous material bed.

7. The medium of claim 6, said adhesive having a viscosity of approximately 6 centipoises at 25° C.

8. A fluid filtering medium comprising a bed of finely divided, low density fibrous material having spaced fluid inlet and fluid outlet faces with the fibers of said material between said inlet and outlet faces interconnected and bonded and the material expanded to form an indeterminate maze of interstices therebetween and sorbent particulate material distributed in said maze of interstices of said medium between said faces, the diameter size of the particles of said particulate material being larger than the diameter size of the fibers of said fibrous material.

9. A fluid filtering medium comprising a bed of finely divided, low density fibrous material having spaced fluid inlet and fluid outlet faces with the fibers of said material between said inlet and outlet faces interconnected and bonded and the material expanded to form an indeterminate maze of interstices therebetween, and catalytic-type particulate material distributed in said maze of interstices of said medium between said faces, the diameter size of the particles of said particulate material being larger than the diameter size of the fibers of said fibrous material.

10. A fluid filtering medium comprising a bed of finely divided low density glass fibrous material having spaced fluid inlet and fluid outlet faces with the fibers of said material between said inlet and outlet faces interconnected and bonded and the material expanded to form an indeterminate maze of interstices therebetween and an activated carbon adsorbent particulate material distributed in said maze of interstices of said fibrous material bed between said faces, the diameter size of the particles of said particulate material being larger than the diameter size of the fibers of said fibrous material.

11. A fluid filtering medium comprising a bed of finely divided low density glass fibrous material having spaced fluid inlet and fluid outlet faces with the fibers of said material between said inlet and outlet faces interconnected and bonded and the material expanded to form an indeterminate maze of interstices therebetween, said fibers each having a diameter of approximately 20 to approximately 25 microns and an activated carbon adsorbent particulate material distributed in said maze of interstices of said fibrous material bed, said carbon particulate material having a particle size of approximately 12 to approximately 50 mesh.

12. A fluid filtering medium comprising a bed of finely divided fibrous material having spaced fluid inlet and fluid outlet faces with the fibers of said material between said inlet and outlet faces interconnected and bonded and the material expanded to form an indeterminate maze of interstices therebetween and fluid treating particulate material distributed in said maze of interstices between said faces, the diameter size of the particles of said particulate material being larger than the diameter size of the fibers of said fibrous material.

13. The fluid filtering medium of claim 12, the diameter size of the particles of said particulate material being approximately 15 to approximately 100 times larger than the diameter size of the fibers of said fibrous material.

14. The fluid filtering medium of claim 12, and an adhesive to bond said particulate material to the fibers of said fibrous material bed.

15. A method of making a fluid treating filtering medium comprising the steps of passing a fibrous pad of filter material into a spraying zone, spraying said pad with an amount of liquid adhesive sufficient to insure said pad is thoroughly treated with said adhesive, passing said pad from said spraying zone to a particle impregnating zone, impregnating said pad with activated fluid treating particles, vibrating said pad to insure distributions of said particles in said pad, passing said pad to a heating zone, and curing said pad in such heating zone at a temperature sufficient to reactivate any of said fluid treating particles which might have been deactivated, but below the decomposition temperature of said adhesive.

16. A method of making a fluid treating filtering medium comprising the steps of passing a fibrous pad of filter material into a spraying zone, spraying said pad with an amount of liquid adhesive sufficient to insure said pad is thoroughly treated with said adhesive, removing said pad from said spraying zone and exposing said pad to the atmosphere for a period of time sufficient to develop maximum tackiness of said adhesive, passing said pad to a particle impregnating zone, impregnating said pad with activated fluid treating particles, vibrating said pad to insure distribution of said particles in said pad, passing said pad to a heating zone, and curing said pad in said heating zone at temperatures sufficient to reactivate any of said fluid treating particles which might have been deactivated but below the decomposition temperature of said adhesive.

17. A method of making fluid treating filtering medium comprising the steps of successively passing a fibrous pad of filter material into a spraying zone, spraying said pad with an amount of liquid adhesive sufficient to insure said pad is thoroughly treated with said adhesive, removing said pad from said spraying zone and exposing said pad to the atmosphere for a period of time sufficient to develop maximum tackiness of said adhesive, passing said pad to a particle impregnating zone, impregnating said pad with activated fluid treating particles as said pad is vibrated to insure thorough distribution of said particles, passing said pad to a heating zone, curing said pad in said heating zone for a residence time and at temperature sufficient to reactivate any of said fluid treating particles which might have been deactivated but below the decomposition temperature of said adhesive, and vibrating said pad after curing to remove excess particles.

References Cited in the file of this patent
UNITED STATES PATENTS

| | | |
|---|---|---|
| 1,056,800 | Krause | Mar. 25, 1913 |
| 1,395,833 | Kling et al. | Nov. 1, 1921 |
| 2,267,918 | Hildabolt | Dec. 30, 1941 |
| 2,416,695 | Jessop et al. | Mar. 4, 1947 |
| 2,539,768 | Anderson | Jan. 30, 1951 |
| 2,746,608 | Briggs | May 22, 1956 |
| 2,774,680 | Hackney et al. | Dec. 18, 1956 |
| 2,798,531 | Jackson | July 9, 1957 |
| 2,940,456 | Touey | June 14, 1960 |